(12) United States Patent
Sim et al.

(10) Patent No.: US 10,654,424 B2
(45) Date of Patent: May 19, 2020

(54) COMPOSITE PANEL FOR SOUND ABSORPTION AND SOUND INSULATION

(71) Applicants: Hyundai Motor Company, Seoul (KR); Kia Motors Corporation, Seoul (KR); Hantec Technology Co., Ltd., Ulsan (KR)

(72) Inventors: Jae Gi Sim, Seoul (KR); Jung Hyeok Lim, Gyeonggi-do (KR); Sung Il Choi, Ulsan (KR); Ki Hoon Son, Ulsan (KR)

(73) Assignees: Hyundai Motor Company, Seoul (KR); Kia Motors Corporation, Seoul (KR); Hantec Technology Co., Ltd., Ulsan (KR)

( * ) Notice: Subject to any disclaimer, the term of this patent is extended or adjusted under 35 U.S.C. 154(b) by 376 days.

(21) Appl. No.: 15/840,466

(22) Filed: Dec. 13, 2017

(65) Prior Publication Data

US 2019/0118733 A1    Apr. 25, 2019

(30) Foreign Application Priority Data

Oct. 24, 2017    (KR) .......................... 10-2017-0138614

(51) Int. Cl.
   *B60R 13/08*     (2006.01)
   *B32B 3/26*      (2006.01)
   *B32B 3/12*      (2006.01)

(52) U.S. Cl.
   CPC ............ *B60R 13/0815* (2013.01); *B32B 3/12* (2013.01); *B32B 3/266* (2013.01); *B32B 2307/102* (2013.01); *B60Y 2306/09* (2013.01)

(58) Field of Classification Search
   CPC . B60R 13/08; B60R 13/0815; B60Y 2306/09; B32B 3/12; B32B 3/266
   USPC ................................ 181/204, 288, 292, 293
   See application file for complete search history.

(56) References Cited

U.S. PATENT DOCUMENTS

| 2,576,698 | A | * | 11/1951 | Russum | .................. | F01B 17/04 |
|           |   |   |         |        |                    | 428/75     |
| 3,370,520 | A | * | 2/1968  | Mauch  | ....................| A47C 7/021 |
|           |   |   |         |        |                    | 454/370    |
| 3,814,208 | A | * | 6/1974  | Morresi| .....................| E04B 1/86  |
|           |   |   |         |        |                    | 181/293    |

(Continued)

FOREIGN PATENT DOCUMENTS

| KR | 20130102320 | A | * | 9/2013 |
| KR | 101355818 | B1 | * | 1/2014 |

(Continued)

*Primary Examiner* — Jeremy A Luks
(74) *Attorney, Agent, or Firm* — Mintz Levin Cohn Ferris Glovsky and Popeo, P.C.; Peter F. Corless (57) ABSTRACT

Disclosed herein is a composite panel for sound absorption that may absorb and block noise. The composite panel may include: a first perforated panel comprising first embosses and first perforation groups formed in a predetermined pattern, wherein the first embosses are formed by forming a plurality of cells and the first perforation groups are formed by collecting a plurality of first perforated holes; an embossed panel comprising second embosses formed by forming the plurality of cells and coupled to the first perforated panel wherein the embossed panel is laminated with the first perforated panel; and a sound absorbing and insulating material inserted between the first perforated panel and the embossed panel.

18 Claims, 7 Drawing Sheets

(56) References Cited

U.S. PATENT DOCUMENTS

| | | | | |
|---|---|---|---|---|
| 3,851,724 | A * | 12/1974 | Banks, Jr. | E04B 1/8409 |
| | | | | 181/208 |
| 4,073,991 | A * | 2/1978 | Focht | B32B 27/00 |
| | | | | 428/138 |
| 4,097,633 | A * | 6/1978 | Focht | B32B 27/00 |
| | | | | 428/138 |
| 4,425,981 | A * | 1/1984 | Kiesewetter | E01F 8/0035 |
| | | | | 181/286 |
| 4,474,172 | A * | 10/1984 | Burke | F24S 40/80 |
| | | | | 126/598 |
| 6,878,432 | B2 * | 4/2005 | Ueda | B32B 3/30 |
| | | | | 181/284 |
| 7,654,364 | B2 * | 2/2010 | Yamaguchi | B32B 3/266 |
| | | | | 181/293 |
| 8,557,395 | B2 * | 10/2013 | Sunaga | B60R 13/0861 |
| | | | | 428/604 |
| 8,733,501 | B2 * | 5/2014 | Porte | F02K 1/827 |
| | | | | 181/292 |
| 9,108,239 | B2 * | 8/2015 | Takahashi | B21D 13/10 |
| 2010/0035078 | A1 * | 2/2010 | Staudt | B32B 3/28 |
| | | | | 428/596 |
| 2014/0060965 | A1 * | 3/2014 | Polonen | B32B 5/02 |
| | | | | 181/292 |
| 2015/0184573 | A1 * | 7/2015 | Sim | B32B 15/01 |
| | | | | 428/593 |

FOREIGN PATENT DOCUMENTS

| | | | |
|---|---|---|---|
| KR | 20140065911 A | * | 5/2014 |
| KR | 101443030 B1 | * | 9/2014 |
| KR | 10-1461919 B1 | | 11/2014 |

* cited by examiner

COMPOSITE PANEL FOR SOUND ABSORPTION AND SOUND INSULATION

CROSS REFERENCE TO RELATED APPLICATION

The present application claims priority to Korean Patent Application No. 10-2017-0138614, filed on Oct. 24, 2017, the entire contents of which is incorporated herein for all purposes by this reference.

TECHNICAL FIELD

The present invention relates to a composite panel for sound absorption and sound insulation, which may be capable of absorbing and blocking external noise.

BACKGROUND OF THE INVENTION

A heat protector has been typically applied to vehicles and a composite panel made of an aluminum panel has been used as a sound absorbing and sound insulating material.

Such a composite panel has a structure in which a sound absorbing and sound insulating material is filled between two aluminum panels, in which the aluminum panel serves to reinforce rigidity of the composite panel and the sound absorbing and insulating material serves as heat insulation, sound absorption, sound blocking, or the like.

In the related art, when a simple flat plate-like aluminum panel is used, the rigidity may not sufficient. Therefore, the rigidity may be reinforced by using an embossed panel made by forming ruggedness on the aluminum panel.

In a conventional panel, for example, hexagonal protruding cells are arranged in a honeycomb structure to be able to maximize the rigidity. On the contrary, processability may deteriorate and thus it is difficult to manufacture a heat protector of a desired shape.

In addition, the sound absorption performance has not been satisfactory merely by using the composite panel filled with the sound absorbing and insulating material.

In order to reinforce the sound absorbing performance, there has been attempted to apply a panel made by perforating an aluminum panel, however, sufficient sound absorption performance has not been obtained.

Accordingly, there is a need for an improved sound absorbing panel capable of solving the above-mentioned problems, and a heat protector using the same.

The matters described as the background art have been provided only for assisting in the understanding for the background of the present invention and should not be considered as corresponding to the related art known to those skilled in the art.

SUMMARY OF THE INVENTION

In preferred aspect, the present invention provides a composite panel for sound absorption and sound insulation that is capable of improving sound absorption performance by laminating a perforated panel effectively transmitting external noise and a sound absorbing and insulating material.

In one aspect, provided is a composite panel for sound absorption. The composite panel may include: a first perforated panel including first embosses and first perforation groups formed in a predetermined pattern, wherein the first embosses include a plurality of cells and the first perforation groups includes a plurality of first perforated holes; an embossed panel having comprising second embosses include the plurality of cells, wherein the embossed panel is coupled to the perforated panel; and a sound absorbing and insulating material inserted between the first perforated panel and the embossed panel. Preferably, the embossed panel may be coupled to the first perforated panel by laminating. The sound absorbing and insulating material may suitably absorb and block noise.

The first perforated panel include: i) a perforated area in which the first perforation group is formed and an outer coupling area formed along an edge of the perforated area and having no first perforation group, and the outer coupling area to be coupled to the embossed panel.

The term "cell" is meant by a structural unit having a predetermined size or shape that may constitute a higher level structure, e.g., embossed structure. Preferred cell in the present invention may be defined in 2-dimensional area on a surface of a panel.

The term "emboss" is meant by a surface structure including at least certain raised surface area or multiply or repeatedly raised surface area. Preferred embosses of the present invention may include repeated raised structures formed by regular or irregular cells formed on the panel.

The term "sound absorbing" as used herein is meant by reducing a level or amplitude of sound or sound wave as the sound wave passing through, for example, a hole or a space. For instance, a sound reducing substance or space may reduce sound by at least 1%, 2%, 5%, 10%, 15%, 20%, 25%, 30%, 40%, 50%, 60% or more relative to same sound that is not impeded by the substance or space. A sound absorbing substance or space typically will not reduce the sound by, for example, up to 70%, 80%, 90%, 95%, 99% or 100% relative to the same sound that is not impeded by the substance or space.

The term "sound insulating" as used herein is meant by blocking sound or sound wave by reflecting the sound wave on the surface of a material or substance. For instance, a sound insulating substance or material may suitably block sound or sound wave by up to 70%, 80%, 90%, 95%, 99% or 100% relative to same sound that is not impeded by the surface of a material or substance.

The term "hole" or "holes" as used herein, refers to a space or vacancy formed inside a panel or layer that may have various internal shapes but make a through-path or be an open-ended. As such, the holes may provide a resonance path of sound or noise, and further provide a sound absorbing property. The resonance path of a sound in the vent holes may not be limited to a specific frequency of sound.

The perforated area of the first perforated panel may include: i) a first inner hole penetrating through the first perforated panel. In addition, in the embossed panel, a position corresponding to the first inner hole may include a second inner hole, and the first perforated panel may further include an inner coupling area that may be formed along a circumference of the first inner hole and may not be provided with the first perforation group. Moreover, the inner coupling area may be coupled to the embossed panel.

In the first perforation group, a virtual regular hexagonal pattern may suitably be formed by collecting a plurality of first perforated holes, and the regular hexagonal patterns may suitably be disposed in a honeycomb structure.

In the first perforation group, a hole having a largest diameter among the first perforated holes may be formed at a center of the virtual regular hexagonal pattern and the rest of the first perforated holes having a diameter decreasing toward edges of the virtual regular hexagonal pattern may be sequentially formed.

A cell formed on the first perforated panel may include a protruding first cell and a depressed second cell to form an embossing structure. Preferably, an area of the first perforation group formed in a virtual regular hexagonal pattern may be different from that of the first cell and the second cell. The first cell may suitably have a regular hexagonal shape, and the first perforated panel may suitably be provided to with the plurality of first cells that are disposed in parallel in a longitudinal direction, adjacent first cells of the plurality of first cells being disposed to share one side and may be provided with the plurality of first cells that are disposed in parallel in a lateral direction, adjacent first cells of the plurality of first cells being disposed to share one vertex. The second cell may suitably have a rhombic shape, and may suitably be formed in an area having sides other than the side shared by adjacent first cells among sides of the first cell.

A protruding height of the first cell and a depressed depth of the second cell may suitably be about 0.05 to 0.2 times a side length of the first cell.

A side length of the first cell may suitably range from about 3 to about 15 mm. In certain embodiments, the side length of the first cell may be from 5 to 10 mm.

Each of the first perforated panel and the second perforated panel may suitably include an aluminum material, and the sound absorbing and insulating material may suitably include a silica fiber material.

The sound absorbing and insulating material may have a nonwoven form of about 300 to 1300 gsm.

In another aspect, provided is a composite panel for sound absorption, that may include: a first perforated panel including first embosses and first perforation groups formed in a predetermined pattern, wherein the first embosses may be formed by forming a plurality of cells and the first perforation groups may be formed by collecting a plurality of first perforated holes; a second perforated panel having second embosses and having second perforation groups formed in a predetermined pattern, and coupled to the first perforated panel, wherein the embosses include a plurality of cells and the second perforation groups include a plurality of second perforated holes, and a sound absorbing and insulating material inserted between the first perforated panel and the second perforated panel. Preferably, the second perforated panel may be coupled to the first perforated panel by laminating. The sound absorbing and insulating material may suitably absorb and block noise.

Further provided are vehicles that includes the composite panel for sound absorption as described herein.

DETAILED DESCRIPTION

Terminologies used herein are to mention only a specific exemplary embodiment, and are not to limit the present invention. Singular forms used herein include plural forms as long as phrases do not clearly indicate an opposite meaning A term "including" used in the present specification concretely indicates specific properties, regions, integer numbers, steps, operations, elements, and/or components, and is not to exclude presence or addition of other properties, regions, integer numbers, steps, operations, elements, components, and/or a group thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

All terms including technical terms and scientific terms used herein have the same meaning as the meaning generally understood by those skilled in the art to which the present invention pertains unless defined otherwise. Terms defined in a generally used dictionary are additionally interpreted as having the meaning matched to the related art document and the currently disclosed contents and are not interpreted as ideal or formal meaning unless defined.

Hereinafter, a composite panel for sound absorption according to an exemplary embodiment of the present invention will be described with reference to the accompanying drawings.

In one preferred aspect, a composite panel for sound absorption and sound insulation according to an exemplary embodiment of the present invention will be described.

Figure 1:
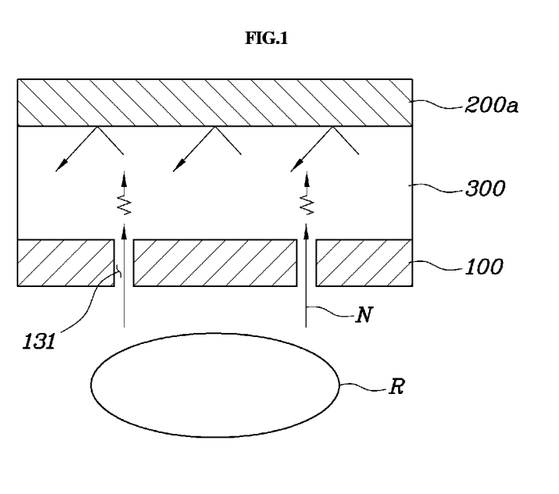
FIG. 1 is a schematic cross-sectional view of an exemplary composite panel according to an exemplary embodiment of the present invention.

FIG. 1 schematically illustrates a cross-sectional structure of an exemplary composite panel according to an exemplary embodiment of the present invention and an exemplary process of allowing the composite panel to absorb noise N generated from a noise source R into a sound absorbing and insulating material 300. FIG. 1 does not illustrate an embossed shape and an edge hemming structure to be described later.

Figure 2:
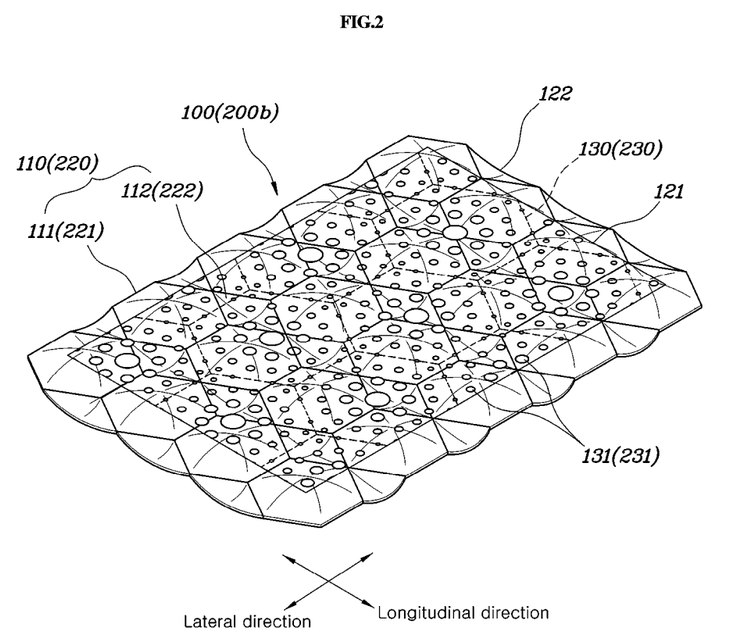
FIG. 2 is a perspective view of an exemplary first perforated panel according to an exemplary embodiment of the present invention.
Figure 3:
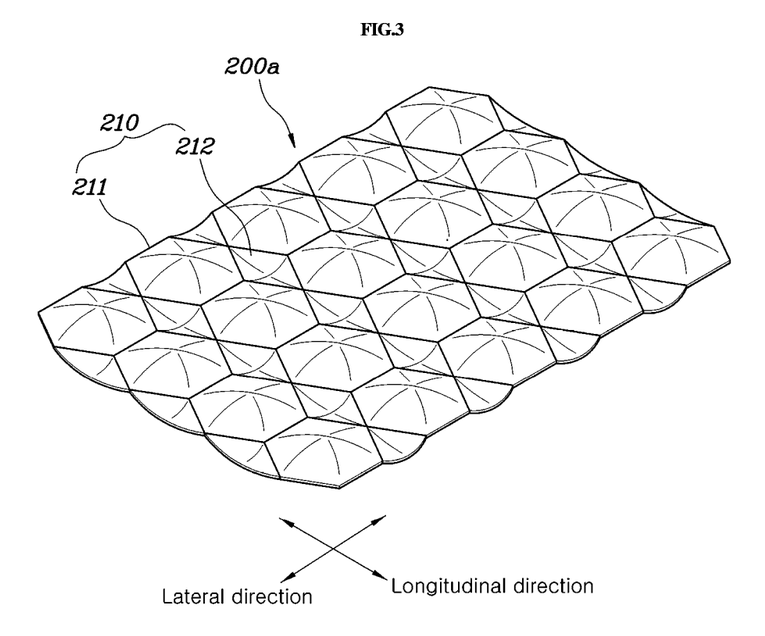
FIG. 3 is a perspective view of an exemplary second panel according to an exemplary embodiment of the present invention.

FIGS. 2 and 3 each are perspective views of an exemplary first perforated panel 100 and an exemplary second panel 200a configuring the composite panel according to an exemplary embodiment of the present invention.

As illustrated in FIGS. 1 to 3, the composite panel for sound absorption and sound insulation according to an exemplary embodiment of the present invention may be configured by inserting the sound absorbing and insulating material 330 between the first perforated panel 100 and the embossed panel 200a that are laminated.

The first perforated panel 100 may be formed by i) forming an embossed shape in which a plurality of cells 110 configuring protruding portions and depressed portions may be formed and forming a plurality of perforated holes 131 penetrating through the first perforated panel 100 on the embossed shape. At this time, the plurality of first perforated holes 131 may suitably have diameters of various sizes and thus form a first perforation group 130 while having a predetermined pattern Preferred diameter of the perforated holes may range from about 0.05 mm to about 0.5 mm.

The embossed panel 200a may have a cell 210 having a shape similar to or the same as that of the first perforated panel 100, but may be different from the first perforated panel 100 in that the second panel (embossed panel) 200a may not be provided with perforated holes.

The sound absorbing and insulating material 300 may be inserted between the first panel 100 and the embossed panel 200a. The sound absorbing and insulating material may absorb and block noise introduced through the first perforated hole 131 formed on the first perforated panel 100, thereby absorption sound or sound waves.

For example, sides of the first perforated panel 100 and the embossed panel 200a may be sealed so that the sound absorbing and insulating material 300 inserted between the laminated first perforated panel 100 and embossed panel 200a may not be separated. Preferably, the first perforated panel 100 may be bonded to the embossed panel 200a, for example, by performing hemming processing on edges of the first perforated panel 100 without using an adhesive or the like.

Figure 4:
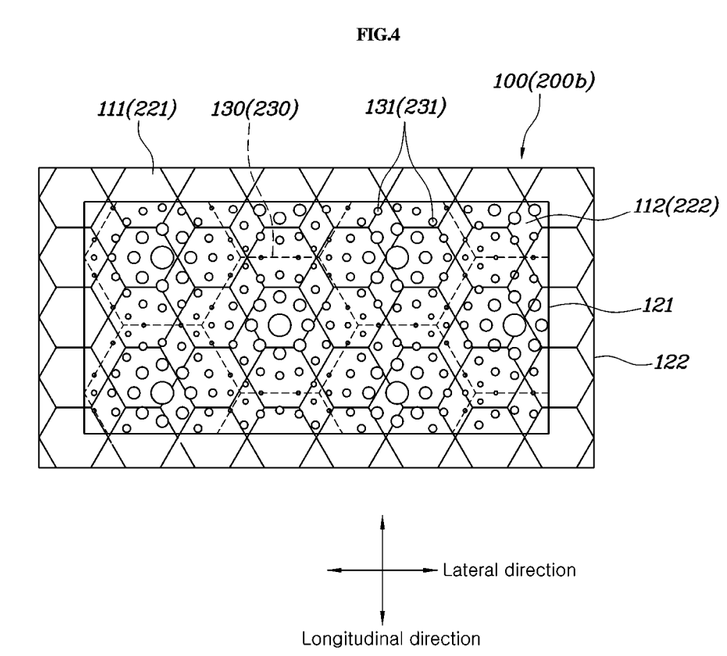
FIG. 4 is a plan view of the first perforated panel according to an exemplary embodiment of the present invention.
Figure 5:
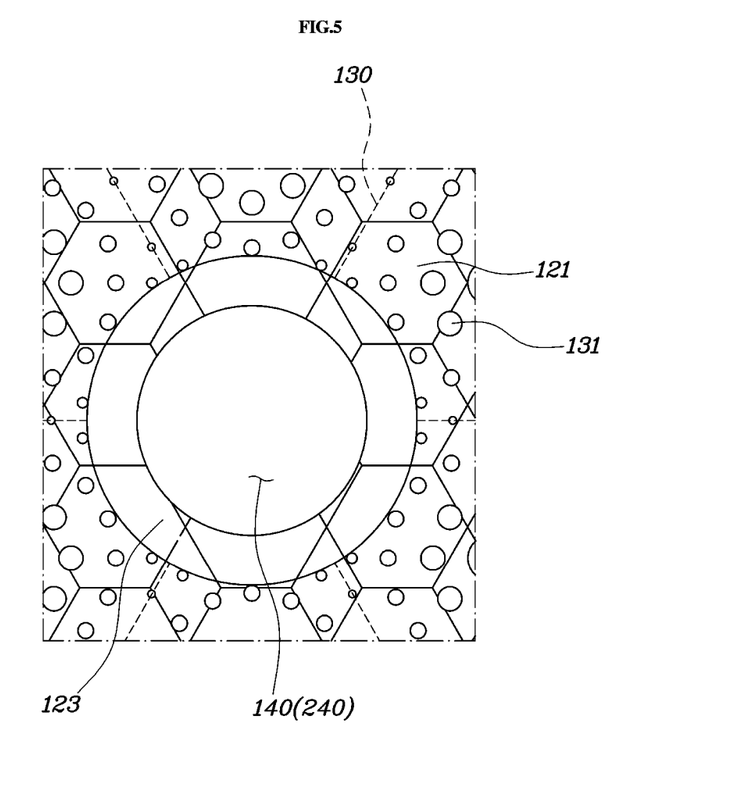
FIG. 5 is a partial plan view of an exemplary appearance when an inner hole is formed on the first perforated panel according to an exemplary embodiment of the present invention.

FIG. 4 is a plan view of an exemplary first perforated panel 100 according to an exemplary embodiment of the present invention, and FIG. 5 is a partial plan view of an exemplary first perforated panel 100 having a first inner hole 140 formed at a central portion thereof.

As illustrated in FIGS. 2 and 4, the cell 110 forming an emboss on the first perforated panel 100 may be uniformly formed over the entire area of the panel, but the first perforated hole 131 may be formed at the central portion of the panel. For instance, the first perforated hole 131 may be formed only in the perforated area 121, and may not be formed in the edge portion or in an outer coupling area 122. Accordingly, a fracture and cracks growing from the first perforated hole 131, which may occur when the outer coupling area 122 suffers from the hemming processing to be coupled to the embossed panel 200a may be prevented.

As illustrated in FIG. 5 with reference to FIGS. 1, 2, and 4, separately from the first perforated hole 131, the first inner hole 140 may be formed at a central portion of the first perforated panel 100, 20 particularly, in a predetermined area of the perforated area 121. Likewise, even in the embossed panel 200a, a second inner hole 240 may be formed at a position corresponding to the first inner hole 140.

The first inner hole 140 and the second inner hole 240 may be spaces for another component that penetrates through the composite panel for sound absorption and sound insulation according to the present invention, and may be coupled to the second panel 200a, for example, by bending the peripheral portion of the first inner hole 140 of the first perforated panel 100. As such, the sound absorbing and insulating material 300 may not be separated toward the first inner hole 140 and the second inner hole 240, thereby sealing the inner side surface.

It is possible to prevent a fracture from occurring due to cracks growing from the first perforated hole 131 when the inner coupling area 123 is bent by forming the inner coupling area 123, in which the first perforated hole 131 may not be formed, at the peripheral portion of the first inner hole 140.

Although not illustrated in detail, to prevent interference from occurring when the inner coupling area 123 is bent to be coupled to the embossed panel 200a, a trimming process may be suitably performed for cutting and removing a portion of the inner coupling area 123.

Figure 6:
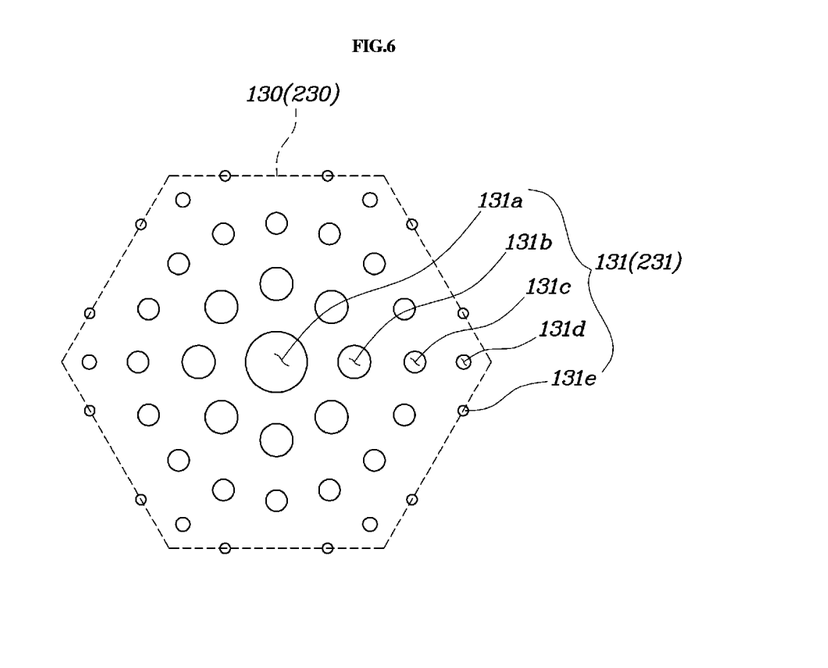
FIG. 6 is a configuration diagram illustrating an exemplary appearance of a perforation group formed on the first perforated panel according to an exemplary embodiment of the present invention.

FIG. 6 is a configuration diagram of a first perforation group 130 according to an exemplary embodiment of the present invention.

As shown in FIGS. 2, 4 and 6, the first perforation group 130 may be a virtual regular hexagonal pattern in which the plurality of first perforated holes 131 may be collected. The first perforation group 130 may be arranged on the first perforated panel 100 in a honeycomb structure.

The virtual regular hexagon formed by the first perforation group 130 may not have any shape or may not be processed portion that may be actually formed on the first perforated panel 100 but may have a virtual shape that serves as a kind of unit cell including the plurality of first perforated holes 131.

The first perforated hole 131 disposed in the first perforation group 130 may have various patterns. For example, a first perforated hole A 131a having a largest diameter may be formed at the center of the first perforation group 130, a plurality of first perforated holes B 131b having a diameter smaller than that of the first perforated hole A 131a are radially arranged along a circumference of the first perforated hole A 131a. In this way, a plurality of first perforated holes C 131c, first perforated holes D 131d, and first perforated holes E 131e having a diameter gradually decreasing toward an edge of the first perforation group 130 may be formed. By forming the first perforated hole 131 in various sizes, a level of noise passing through the first perforated hole 131 may be attenuated while resonating with various frequencies of noise.

As described above, since the first perforation group 130 is disposed in the honeycomb structure on the first perforated panel 100, the first perforated holes 131 having various sizes may be distributed over the whole of the first perforated panel 100 at a predetermined density, thereby maximizing the sound absorbing performance.

FIG. 6 illustrates an exemplary first perforation group 130 including the first perforated holes 131 having five different sizes. Therefore, the present invention is not limited thereto, and the number of perforated holes having various diameters and the specific arrangement shape of the perforated holes may be changed as needed.

Meanwhile, as illustrated in FIGS. 2 to 4, the cell 110 formed on the first perforated panel 100 may be largely divided into a first cell 111 and a second cell 112.

For example, the first cell 111 may be formed so as to have a regular hexagonal base and may protrude in a direction of one surface of the first perforated panel 100 and protrude to have a shape of arc between apexes facing each other when viewed from the side.

The second cell 112 may be formed to have a rhombic base and protrudes in a direction of the other surface of the first perforated panel 100 and protrude to have a shape of an arc between apexes facing each other like the first cell 111.

The rigidity of the panel may be increased by forming the embossed shape on the panel through the first cell 111 and the second cell 112, thereby preventing the deformation due to the external force and improving the durability.

The cell 210 formed on the embossed panel 200a may also be divided into a first cell 211 and a second cell 212 like the first perforated panel 100, and the shape thereof may suitably be the same as the cell 110 of the first perforated panel 100. For instance, the description of the cell 110 of the first perforated panel 100 may also be applied to the cell 210 of the embossed panel 200a.

The areas of the first cell 111 and the second cell 112, or the areas formed by each base, may be preferably formed to be different from the area of the first perforation group 130.

For example, when the area of the first cell 111 and the area of the first perforation group 130 are the same, a portion where specific positions of each of the first cells 111 may overlap with specific positions of each of the first perforation group 130 may appear repeatedly, which may make the positions and shapes of the first perforated holes 131 comparatively regular. Therefore, the frequency of sound that may be absorbed and blocked may be limited.

However, when the size of the first perforation group 130 is formed to have an area different from that of the first cell 111 and the second cell 112, since the specific positions of each of the first perforation groups 130 may not substantially overlap with the specific positions of the first cell 111 and the second cell 112, the positions and shapes of the first perforated holes 131 may be irregular. As a result, the sound absorption performance may be improved by diversifying the frequencies of sound.

The first cells 111 may be arranged so that the first cells 111 adjacent to each other in a longitudinal direction may share one side, and the first cells 111 adjacent to each other in a lateral direction may share one apex.

The second cell 112 may be surrounded by four different first cells 111. In accordance with the arrangement of the first cell 111 described above, each of the first cells 111 may share a side with two adjacent first cells 111 and may share an apex with two another first cells 111, such that the first cell 111 may have four sides that may not be shared with first cells 111 adjacent thereto.

A side that is not shared with the adjacent first cell 111 may form a rhombic side of the second cell 112.

The embossed panel having the embosses formed by the first cell 111 having a regular hexagonal shape and the second cell 112 having a rhombic shape may have rigidity less than that of the embossed panel having the honeycomb-shaped emboss, but may have improved formability to be able to be processed in a desired form, for example, easily press-molded.

From the position where the base of the first cell 111 is formed, the height of the first cell 111 and the depth of the second cell 112 may suitably be about 0.05 to 0.25 times the length of the side of the first cell 111.

When the height is less than about 0.05 times, the effect of reinforcing the rigidity by the shape of each cell may not be sufficient, and when the height is greater than about 0.25 times, the damage such as the fracture of the panel during the embossing may occur or the molding defect, the damage, or the like may occur during the additional shape processing.

Accordingly, the side length of the first cell 111 may suitably be about 3 to 15 mm.

When the side length of the first cell 111 is less than about 3 mm, the number of processing steps may be increased and thus the processing cost may be increased, such that the efficiency may be reduced and the formability may deteriorate at the time of the shape processing of the finished product. On the other hand, when the side length is greater than about 15 mm, the size of the pattern may be excessively large and the rigidity reinforcing effect may decrease.

Accordingly, the side length of the first cell 111 may suitably be about 3 to 15 mm, or particularly about 5 to 10 mm.

The first perforated panel 100 and the embossed panel 200a may be preferably made of an aluminum alloy for processability, rigidity, thermal conductivity, and the like and the sound absorbing and insulating material 300 may preferably include a material having excellent heat resistance such as silica fiber.

Preferably, the sound absorbing and insulating material 300 may be in a nonwoven form of 300 to 1300 gram per square meter (gsm). When the density is less than about 300 gsm, the noise absorbing performance may be reduced and thus noise penetrates, and when the density is greater than about 1300 gsm, the weight may increase excessively and the improvement in the noise absorption performance may not be sufficient. Preferably, the density of the sound absorbing and insulating material 300 may range from about 300 to about 1300 gsm.

The first perforated panel 100 and the embossed panel 200a may suitably include an aluminum alloy and the sound absorbing and insulating material 300 may suitably include a heat resistant material to prevent deformation and damage from occurring due to high temperature. As such, the composite panel for sound absorption and sound insulation according to the present invention may be used as a heat protector of an engine-exhaust system.

For instance, large amount of noise and vibrations are generated at the engine-exhaust system, for example, the peripheral portion of the exhaust manifold, the composite panel for sound absorption configured in a form in which the first perforated panel 100 may be disposed closely or toward the peripheral portion of the exhaust manifold as the heat protector. Therefore, the damage due to overheat while effectively blocking may be prevented and the noise generated from the engine-exhaust system may be efficiently absorbed.

As illustrated in FIGS. 2 and 4 to 7, a composite panel for sound absorption and sound insulation according to an exemplary embodiment of the present invention may include the same first perforated panel 100 and the sound absorbing and insulating material 300 as described above, and the composite panel may be different from that the above described composite panel. For example, a second perforated panel 200b may be used instead of the second panel 200a, and the perforated holes may be formed both on two panels forming the both sides of the composite panel for sound absorption.

Figure 7:
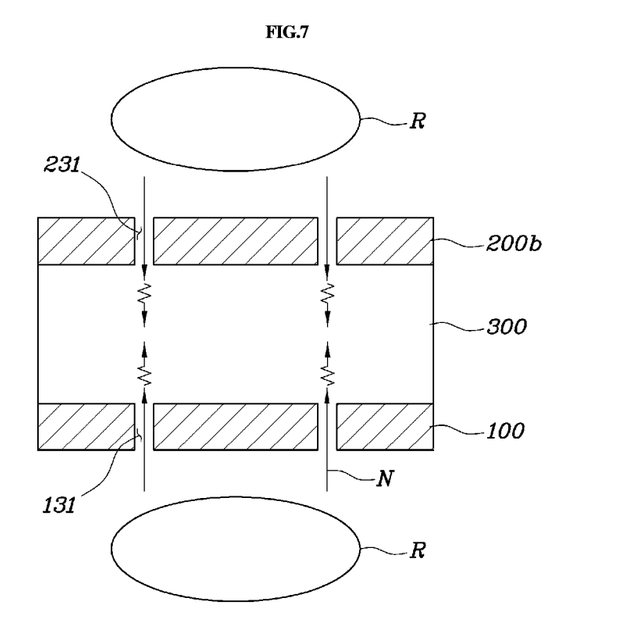
FIG. 7 is a schematic cross-sectional view of an exemplary composite panel according to an exemplary embodiment of the present invention.

A plurality of second perforated holes 231 having two or more different diameters may be collected on the second perforated panel 200b to form a second perforation group 230 having a virtual regular hexagonal shape. The configuration of the second perforation group 230 may be the same as that of the first perforation group 130.

In addition, specific shapes of the cell 220, the perforated area 121, the outer coupling area 122, the inner coupling area 123, or the like that are formed on the second perforated panel 200b may be preferably the same as those of the first perforated panel 100, and therefore the same description will be omitted.

Hereinafter, an action and an effect of the composite panel according to the present invention will be described.

As illustrated in FIG. 1, the composite panel according to the present invention may absorb noise N introduced through the first perforated hole 131 formed on the first perforated panel 100 close to a noise source R into the sound absorbing and insulating material 300 and reflect the transmitted noise N from the embossed panel 200a, thereby minimizing the noise transmitted in the direction of the embossed panel 200a.

When the noise sources are present on both sides of the composite panel, as illustrated in FIG. 7, after the noise N generated from each of the noise sources R may be introduced into the composite panel through the first perforated hole 131 formed on the first perforated panel 100 and a second perforated hole 231 formed on the second perforated panel 200b, the noise N may be absorbed into the sound absorbing and insulating material 300, which may lead to attenuate the noise.

At this time, the noise N generated from the noise source R in the direction of the first perforated panel 100 may flow out through the second perforated hole 231 of the second perforated panel 200b. For instance, the noise N may be attenuated while passing through the second perforated hole 231 according to the frequency of the noise N and the noise attenuation effect that may be obtained by absorbing the noise N generated from the noise source R in the direction of the second perforated panel 200b into the sound absorbing and insulating material 300 may be improved. Accordingly, the perforated holes may be formed on both panels configuring the composite panel for sound absorption to improve the sound absorbing performance.

According to various exemplary embodiments of the present invention, the sound absorption may be performed with high efficiency by transmitting the external noise of various frequencies through the perforated holes having various sizes and absorbing the transmitted external noise into the sound absorbing and insulating material. In addition, the present invention may provide the panel having higher processability and having the higher rigidity in the embossed structure by the cell than in the arrangement of the honeycomb-shaped cells.

Although exemplary embodiments of the present invention have been described with reference to the accompanying drawings, those skilled in the art will appreciate that various modifications and alterations may be made without departing from the spirit or essential feature of the present invention.

Therefore, it should be understood that the above-mentioned exemplary embodiments are not restrictive but are exemplary in all aspects. It is to be understood that the scope of the present invention will be defined by the claims rather than the above-mentioned description and all modifications and alternations derived from the claims and their equivalents are included in the scope of the present invention.

What is claimed is:

1. A composite panel for sound absorption, comprising:
a first perforated panel comprising first embosses and first perforation groups formed in a predetermined pattern, wherein the first embosses comprises a plurality of cells and the first perforation groups comprises a plurality of first perforated holes;
an embossed panel comprising second embosses comprising the plurality of cells, the embossed panel coupled to the first perforated panel; and
a sound absorbing and insulating material inserted between the first perforated panel and the embossed panel to absorb and block noise,
wherein in the first perforation group, a virtual regular hexagonal pattern is formed by a group of the plurality of first perforated holes, and the regular hexagonal patterns are disposed in a honeycomb structure.

2. The composite panel of claim 1, wherein the embossed panel is coupled to the first perforated panel by laminating.

3. The composite panel of claim 1, wherein the sound absorbing and insulating material absorbs and blocks noise.

4. The composite panel of claim 1, wherein the first perforated panel comprises:
   i. a perforated area comprising the first perforation groups and an outer coupling area formed along an edge of the perforated area and having no first perforation group, and
   ii. the outer coupling area coupled to the embossed panel.

5. The composite panel of claim 4, wherein the perforated area of the first perforated panel comprises a first inner hole penetrating through the first perforated panel,
   in the embossed panel a position corresponding to the first inner hole is provided with a second inner hole,
   the first perforated panel further comprises an inner coupling area that is formed along a circumference of the first inner hole and is not provided with the first perforation group, and
   the inner coupling area coupled to the embossed panel.

6. The composite panel of claim 1, wherein in the first perforation group, among the first perforated holes, a hole having a largest diameter is formed at a center of the virtual regular hexagonal pattern and the rest of the first perforated holes having a diameter decreasing toward edges of the virtual regular hexagonal pattern are sequentially formed.

7. A composite panel for sound absorption, comprising:
a first perforated panel comprising first embosses and first perforation groups formed in a predetermined pattern, wherein the first embosses comprises a plurality of cells and the first perforation groups comprises a plurality of first perforated holes;
an embossed panel comprising second embosses comprising the plurality of cells, the embossed panel coupled to the first perforated panel; and
a sound absorbing and insulating material inserted between the first perforated panel and the embossed panel, to absorb and block noise,
wherein a cell formed on the first perforated panel comprises a protruding first cell and a depressed second cell to form an embossing structure, and
an area of the first perforation group formed in a virtual regular hexagonal pattern is different from that of the first cell and the second cell.

8. The composite panel of claim 7 wherein the first cell has a regular hexagonal shape, and the first perforated panel comprises the plurality of first cells that are disposed in parallel in a longitudinal direction, adjacent first cells of the plurality of first cells being disposed to share one side and is provided with the plurality of first cells that are disposed in parallel in a lateral direction, adjacent first cells of the plurality of first cells being disposed to share one vertex.

9. The composite panel of claim 7, wherein the second cell has a rhombic shape, and is formed in an area having sides other than the side shared by adjacent first cells among sides of the first cell.

10. The composite panel of claim 7, wherein a protruding height of the first cell and a depressed depth of the second cell are about 0.05 to 0.2 times a side length of the first cell.

11. The composite panel of claim 7, wherein a side length of the first cell ranges from about 3 to about 15 mm.

12. The composite panel of claim 1, wherein each of the first perforated panel and the embossed panel comprises an aluminum material, and the sound absorbing and insulating material comprises a silica fiber material.

13. The composite panel of claim 12, wherein the sound absorbing and insulating material has a nonwoven form of about 300 to 1300 gsm.

14. A composite panel for sound absorption, comprising:

first perforated panel comprising first embosses and first perforation groups formed in a predetermined pattern, wherein the first embosses are formed by forming a plurality of cells and the first perforation groups are formed by a plurality of first perforated holes;

a second perforated panel comprising second embosses and second perforation groups formed in a predetermined pattern, wherein the second perforated panel is coupled to the first perforated panel by laminating, the second embosses are formed by forming a plurality of cells and the second perforation groups are formed by collecting a plurality of second perforated holes, and a sound absorbing and insulating material inserted between the first perforated panel and the second perforated panel to absorb and block noise, wherein in the first perforation group, a virtual regular hexagonal pattern is formed by a group of the plurality of first perforated holes, and the regular hexagonal patterns are disposed in a honeycomb structure.

15. The composite panel of claim 14, wherein the second perforated panel is coupled to the first perforated panel by laminating.

16. The composite panel of claim 14, wherein the sound absorbing and insulating material absorbs and blocks noise.

17. A vehicle comprising a composite panel of claim 1.

18. A vehicle comprising a composite panel of claim 14.

* * * * *